US012662023B2

(12) United States Patent
Lee et al.

(10) Patent No.: US 12,662,023 B2
(45) Date of Patent: Jun. 23, 2026

(54) VEHICLE SEAT

(71) Applicant: HYUNDAI TRANSYS INC., Seosan-si (KR)

(72) Inventors: Jung Bin Lee, Hwaseong-si (KR); Ho Sung Kang, Yangsan-si (KR); Gwon Hwa Bok, Yongin-si (KR); Seong Il Lim, Hwaseong-si (KR); Dong Hyun Kim, Suwon-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 224 days.

(21) Appl. No.: 18/561,829

(22) PCT Filed: Jul. 18, 2022

(86) PCT No.: PCT/KR2022/010471
§ 371 (c)(1),
(2) Date: Nov. 17, 2023

(87) PCT Pub. No.: WO2023/003306
PCT Pub. Date: Jan. 26, 2023

(65) Prior Publication Data
US 2024/0239246 A1 Jul. 18, 2024

(30) Foreign Application Priority Data

Jul. 19, 2021 (KR) ........................ 10-2021-0094419

(51) Int. Cl.
*B60N 2/20* (2006.01)
*B60N 2/12* (2006.01)
*B60N 2/30* (2006.01)

(52) U.S. Cl.
CPC ................. *B60N 2/12* (2013.01); *B60N 2/20* (2013.01); *B60N 2/206* (2013.01); *B60N 2/3002* (2013.01); *B60N 2/3011* (2013.01)

(58) Field of Classification Search
CPC . B60N 2/20; B60N 2/12; B60N 2/206; B60N 2/3011; B60N 2/2356; B60N 2/3002; B60N 2/04; B60N 2/203
See application file for complete search history.

(56) References Cited

U.S. PATENT DOCUMENTS 7,686,398 B2 * 3/2010 Yokoyama ............... B60N 2/12
297/378.12
9,061,605 B2 6/2015 Hurst et al.
(Continued)

FOREIGN PATENT DOCUMENTS

CN 101746290 A 6/2010
CN 103158584 A 6/2013
(Continued)

OTHER PUBLICATIONS

Jazbec Simon, "European Search Report for EP Application No. EP22846176", Mar. 10, 2025, EPO, Germany.

*Primary Examiner* — Syed A Islam
(74) *Attorney, Agent, or Firm* — Bridgeway IP Law Group, PLLC; Jihun Kim

(57) ABSTRACT

Proposed is a vehicular seat including a recliner installed to adjust an inclination angle of a back frame, a first walk-in lever installed to release the recliner by being rotated with an operational force for walk-in from an initial position to an operating position, a folding lever installed to rotate the first walk-in lever when rotated with an operational force for folding and thus to release the recliner, a second walk-in lever installed on a cushion frame in order to be rotated by the back frame inclined inward by the releasing of the recliner and thus to unlock a seat rail and restrict inward inclining of the back frame, and an in-unison operating mechanism provided to rotate the second walk-in lever in unison with the folding lever, in order not to restrict the
(Continued)

inward inclining of the back frame when the folding lever is rotated to release the recliner.

13 Claims, 9 Drawing Sheets

(56)                    References Cited

U.S. PATENT DOCUMENTS

2004/0021355  A1     2/2004   Ohba
2012/0025581  A1     2/2012   Watanabe
2018/0050616  A1     2/2018   Nozue et al.

FOREIGN PATENT DOCUMENTS

| | | |
|---|---|---|
| CN | 103507664 A | 1/2014 |
| DE | 102009035305 A1 | 6/2010 |
| JP | 2012-218610 A | 11/2012 |
| KR | 10-2017-0056744 A | 5/2017 |
| KR | 10-2018-0045478 A | 5/2018 |
| KR | 10-1864253 B1 | 7/2018 |
| KR | 10-1951182 B1 | 2/2019 |
| KR | 10-2021-0076543 A | 6/2021 |

* cited by examiner

VEHICLE SEAT

TECHNICAL FIELD

The present invention relates to a technology associated with a walk-in function and a folding function of a vehicular seat.

BACKGROUND ART

Front seats of recreational vehicle (RV) or three door-type vehicle have a walk-in function in order for an occupant who is to sit on or leave a rear seat to get in or out of the vehicle.

The 'walk-in' function of a vehicular seat refers to a function in which, when the occupant who is to sit on or leave the rear seat of the vehicle operates a walk-in lever adjacent to front seat of the vehicle or a walk-in switch thereon, a seat back is inclined forward to a predetermined angle and, at the same time, the front seat is slid forward over a predetermined distance. When the walk-in function is performed, a space is secured between the front seat and the rear seat in order to the occupant who is to sit on or leave the rear seat to get in and out of the vehicle.

The vehicular seat also has the folding function distinct from the walk-in function. The folding function refers to a function in which the seat back is inclined forward at a greater angle than in the walk-in function. Usually, the seat back can be inclined forward up to a position where it comes into contact with a seat cushion. The angle at which the seat back is inclined forward is fixed by a recliner.

The related art is disclosed in Korean Patent Application Publication No. 10-2017-0056744 A.

The foregoing is intended merely to aid in the understanding of the background of the present invention, and is not intended to mean that the present invention falls within the purview of the related art that is already known to a person of ordinary skill in the art.

DISCLOSURE

Technical Problem

An object of the present invention is to provide a vehicular seat capable of performing both a folding function and a walk-in function with components, necessary to perform the folding function and the walk-in function, being installed only on one side of the vehicular seat. Thus, the vehicular seat is capable of having a simple and compact configuration, thereby reducing the number of the components and the weights thereof and more easily configuring a seat assembly including a multiplicity of seats.

Technical Solution

In order to accomplish the above-mentioned object, according to an aspect of the present invention, there is provided a vehicular seat including:

a recliner installed in such a manner as to adjust an inclination angle of a back frame with respect to a cushion frame;

a first walk-in lever installed in such a manner as to release the recliner by being rotated with an operational force for walk-in from an initial position to an operating position;

a folding lever installed in such a manner as to rotate the first walk-in lever when rotated with an operational force for folding and thus to release the recliner;

a second walk-in lever installed on the cushion frame in such a manner as to be rotated by the back frame inclined inward by the releasing of the recliner and thus to unlock a seat rail in a locked state and restrict inward inclining of the back frame; and an in-unison operating mechanism provided in such a manner as to rotate the second walk-in lever in unison with the folding lever, so that the second walk-in lever does not restrict the inward inclining of the back frame when the folding lever is rotated to release the recliner.

In the vehicular seat, the first walk-in lever may be coupled to an input shaft of the recliner in such a manner that the rotating of the first walk-in lever is restricted, the folding lever may be rotatably installed on the input shaft, so that the folding lever is concentric with the first walk-in lever, and a driving-for-releasing protrusion may be provided on the folding lever in a manner that protrudes from the folding lever toward the first walk-in lever, so that the driving-for-releasing protrusion is enabled to be rotated with the operational force for folding, thereby rotating the first walk-in lever.

In the vehicular seat, a driven-for-releasing protrusion may be provided on the first walk-in lever in a manner that protrudes from the first walk-in lever toward the folding lever to stably receive a rotational displacement transferred by the driving-for-releasing protrusion.

In the vehicular seat, a walk-in protrusion may be provided on the second walk-in lever in a manner that protrudes from the second walk-in lever toward a radial direction from a rotational center of the second walk-in lever, so that the walk-in protrusion is hooked onto a folding restriction protrusion on the back frame that is inclined inward by releasing the recliner, and a walk-in cable for unlocking the seat rail in the locked state when pulled may be connected to the second walk-in lever.

In the vehicular seat, the second walk-in lever may be installed under the first walk-in lever, and the walk-in protrusion may protrude upward from the rotational center of the second walk-in lever.

In the vehicular seat, the in-unison operating mechanism may be configured as a link member, both end portions of the link member being connected in a rotatable state to the folding lever and the second walk-in lever, respectively.

In the vehicular seat, one end portion of the link member may be connected to a side of the folding lever, which is opposite to another side of the folding lever, on which the driving-for-releasing protrusion is provided, with a rotational center of the folding lever being positioned between the both sides of the folding lever, and another end portion of the link member may be connected to a side of the second walk-in lever, which is opposite to another side of the second walk-in lever, to which the walk-in cable is connected, with the rotational center of the second walk-in lever being positioned between the both sides of the second walk-in lever.

In the vehicular seat, the second walk-in lever may include:

an in-unison operating lever connected to the folding lever through the in-unison operating mechanism; and an operating lever installed in a manner that is concentric with the in-unison operating lever and is relatively rotatable within a predetermined range and performing a function of unlocking the seat rail in the locked state and restricting the inward inclining of the back frame.

In the vehicular seat, a range where the in-unison operating lever and the operating lever are relatively rotatable with respect to each other may be set to be restricted by an arc adjustment groove formed in each of the in-unison operating lever and the operating lever and an adjustment pin that is inserted into the arc adjustment groove.

In the vehicular seat, a support spring that elastically supports the in-unison operating lever and the operating lever in such a manner that relative positions thereof are kept constant may be installed between the in-unison operating lever and the operating lever.

In the vehicular seat, a walk-in protrusion may be provided on the operating lever in a manner that protrudes from the second walk-in lever toward a radial direction from a rotational center of the second walk-in lever, so that the walk-in protrusion is hooked onto a folding restriction protrusion on the back frame that is inclined inward by releasing the recliner, and a walk-in cable for unlocking the seat rail in the locked state may be connected at a position that is spaced away from the walk-in protrusion.

In the vehicular seat, the in-unison operating lever is connected to the folding lever by the in-unison operating mechanism, on an opposite side from where the walk-in cable is connected to the operating lever, with a rotational center of the operating lever as a reference point.

In the vehicular seat, the in-unison operating mechanism may be configured as a link member that connects the folding lever and the in-unison operating lever, in such a manner that, when the folding lever is rotated in a direction in which the recliner is released, the walk-in protrusion on the second walk-in lever is out of a rotational radius of the folding restriction protrusion on the back frame and in such a manner that the second walk-in lever is rotated in a direction opposite to a direction in which the walk-in cable is pulled.

Advantageous Effects

According to the present invention, a vehicular seat can perform both a folding function and a walk-in function with components, necessary to perform the folding function and the walk-in function, being installed only on one side of the vehicular seat. Thus, the vehicular seat can have a simple and compact configuration, thereby reducing the number of the components and the weights thereof and more easily configuring a seat assembly including a multiplicity of seats.

MODE FOR INVENTION

Figure 1:
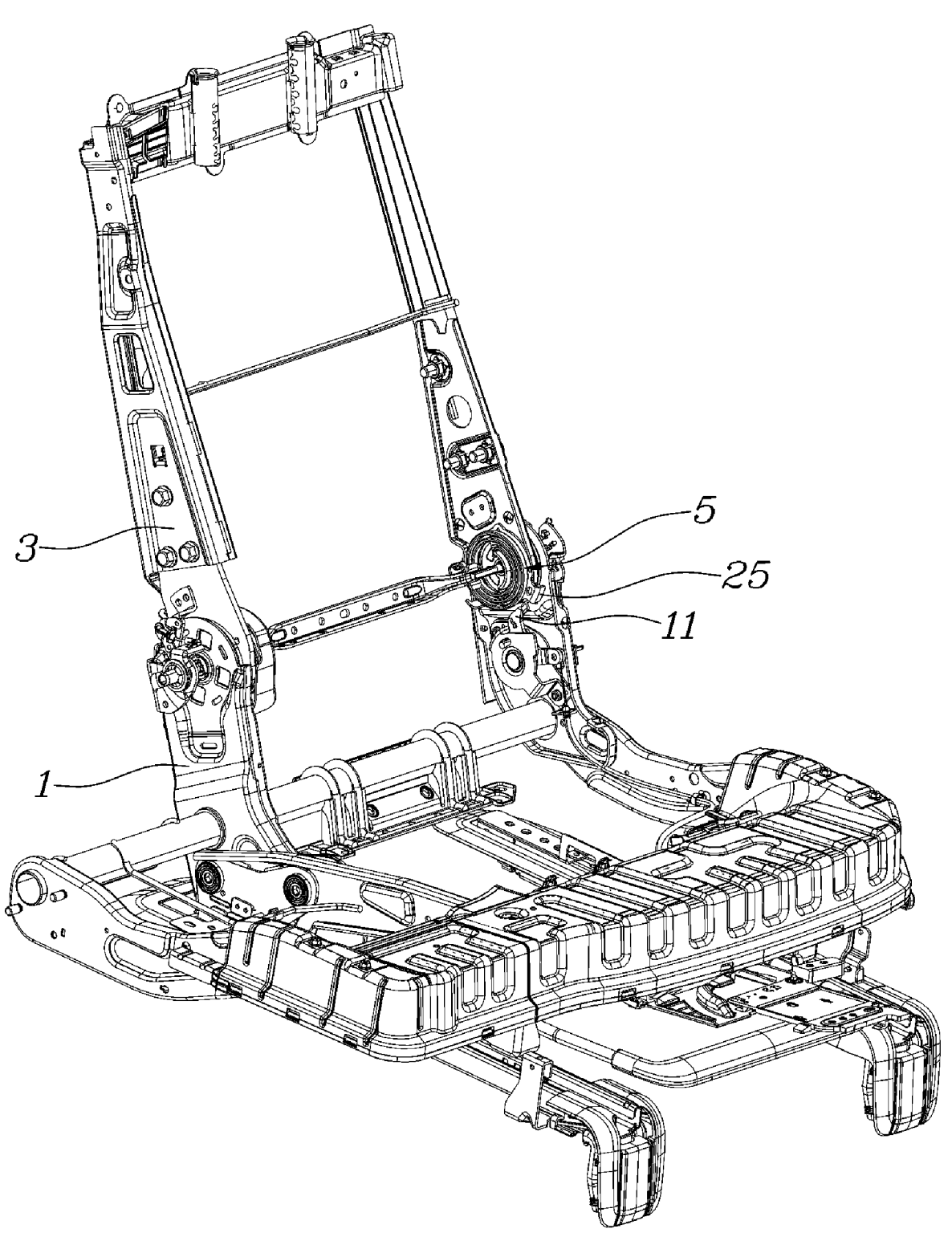
FIG. 1 is a view illustrating a structure of a vehicular seat according to the present invention.

An embodiment of the present invention will be described in terms of specific structures and functions to enable a person of ordinary skill in the art to comprehend the present invention. The embodiment of the present invention may be practiced in various ways, and the present invention should not be construed as being limited thereto.

Various modifications may be made in various ways to the embodiment of the present invention. Therefore, a specific embodiment will be described in detail below with reference to the accompanying drawings. However, such a specific embodiment is not intended to impose any limitation on the technical idea of the present invention. All alterations, equivalents, and substitutes that are included within the technical idea of the present invention should be understood as falling within the scope of the present invention.

The terms first, second, and so on may be used to describe various constituent elements but should not limit the meanings of these constituent elements. These terms are only used to distinguish one constituent element from another. For example, a first constituent element may be termed a second constituent element without departing from the scope of the present invention. Likewise, the second constituent element may also be termed the first constituent element.

It should be understood that a constituent element, when referred to as being "coupled to" or "connected to" a different constituent element, may also be directly coupled to or directly connected to the different constituent element, or may also be coupled to or connected to the different constituent element with a third constituent element in between. Likewise, it should be understood that a constituent element, when referred to as being "directly coupled to" or "directly connected to" a different constituent element, may be coupled to or connected to the different constituent element without a third constituent element in between. The same is true for terms referring to a relationship between constituent elements. For example, the terms "between" and "directly between" and the terms "adjacent to" and "directly adjacent to" should also be construed in the same manner.

The terms used throughout the present specification are only for describing a specific embodiment and are not intended to impose any limitation on the present invention. A noun in singular form has the same meaning as when used in its plural form, unless it has a different meaning in context. It should be understood that, throughout the present specification, the term "include," "have," or the like is intended to indicate that a feature, a number, a step, an operation, a constituent element, a component, or a combination thereof is present, without precluding the possibility that one or more other features, numbers, steps, operations, constituent elements, components or a combination thereof will be present or added.

Unless otherwise defined, each of all the terms used throughout the present specification, including technical or scientific terms, has the same meaning as is normally understood by a person of ordinary skill in the art to which the present invention pertains. A term as defined in commonly used dictionaries should be construed as having the same contextual meaning as that used in the relevant field of technology and, unless otherwise explicitly defined in the present specification, should not be construed as having an excessively implied meaning or a purely literal meaning.

A preferred embodiment of the present invention will be described in detail below with reference to the accompanying drawings. The same reference numerals on the drawings refer to the same constituent element.

A vehicular seat is configured in such a manner that a seat back against which a user sitting on a seat cushion can lean can be inclined in the forward-backward direction with respect to the seat cushion. The seat back is configured in such a manner that an inclination angle thereof can be adjusted by a recliner 5.

Figure 2:
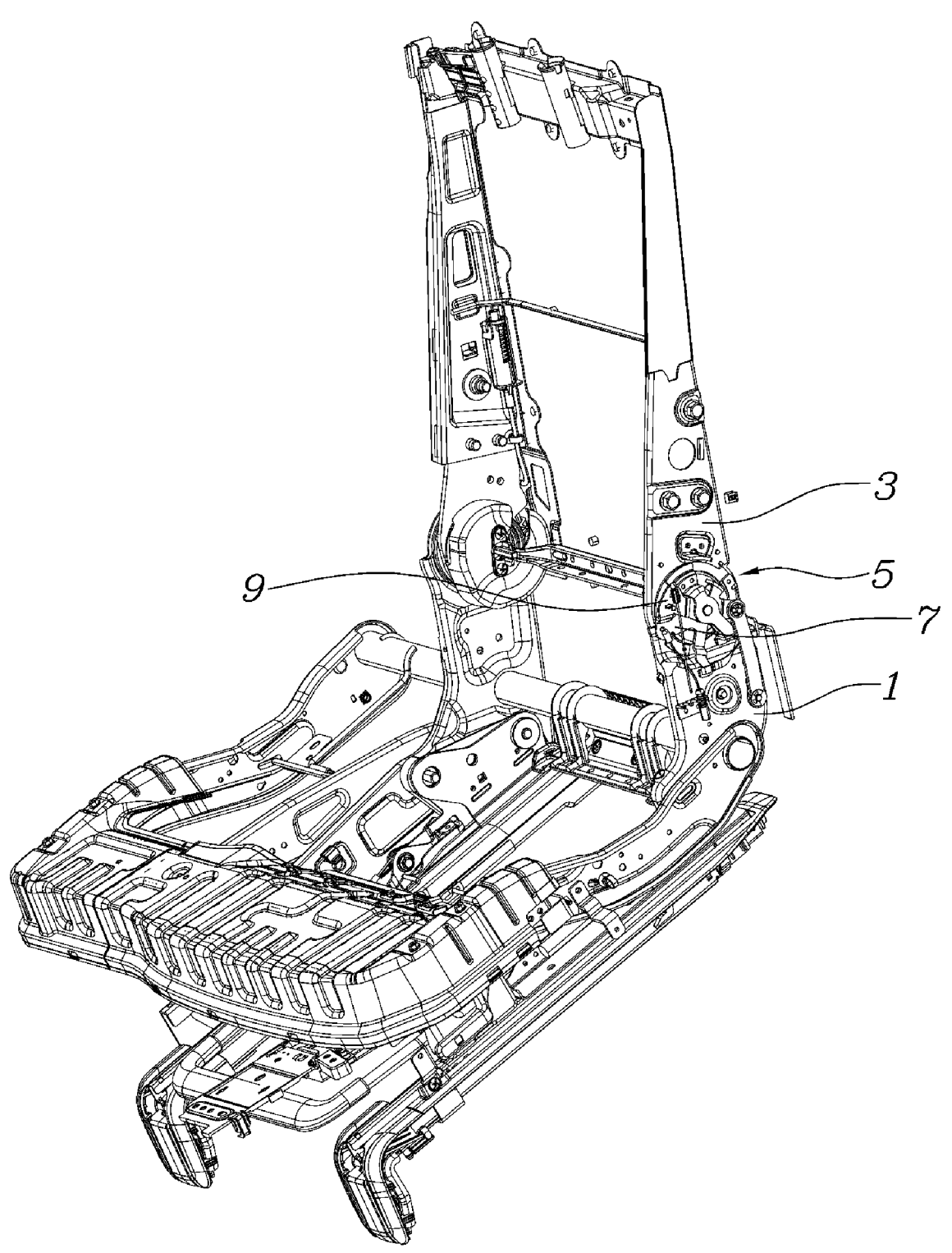
FIG. 2 is a view illustrating the structure of a vehicular seat according to the present invention, when viewed from the opposite side.
Figure 3:
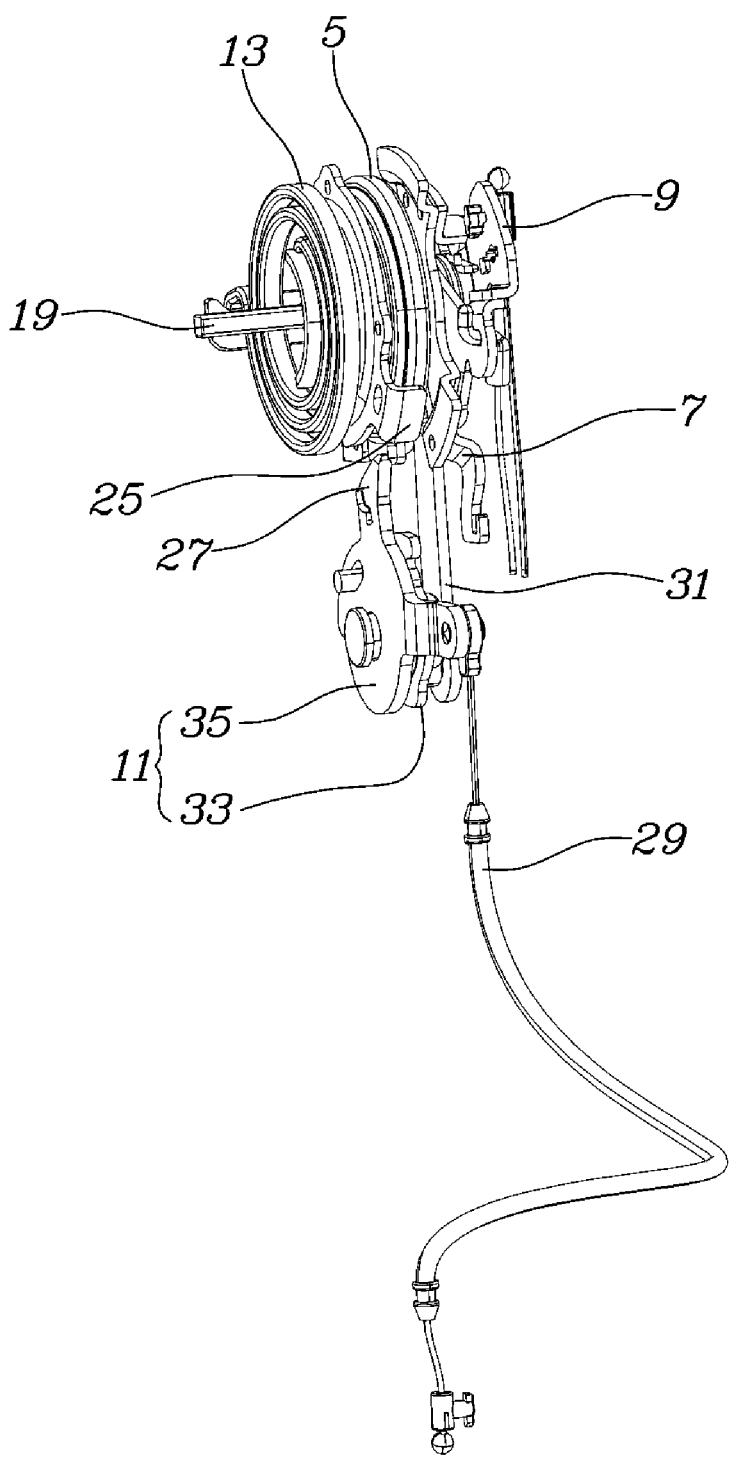
FIGS. 3 to 5 are views illustrating constituent elements of the vehicular seat according to the present invention in terms of structure, with a cushion frame and a back frame being removed, when viewed from different angles, respectively.
Figure 4:
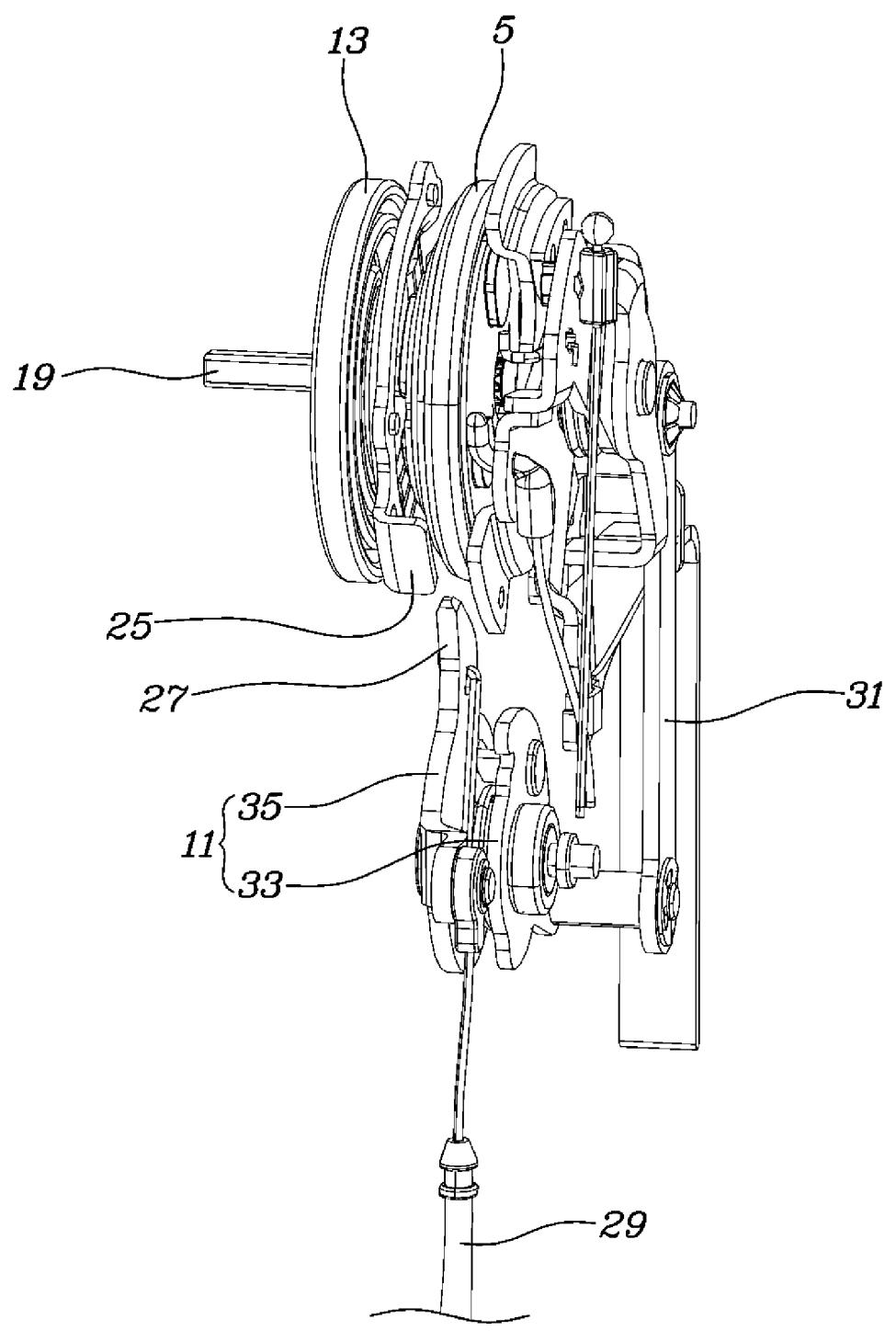
Figure 5:
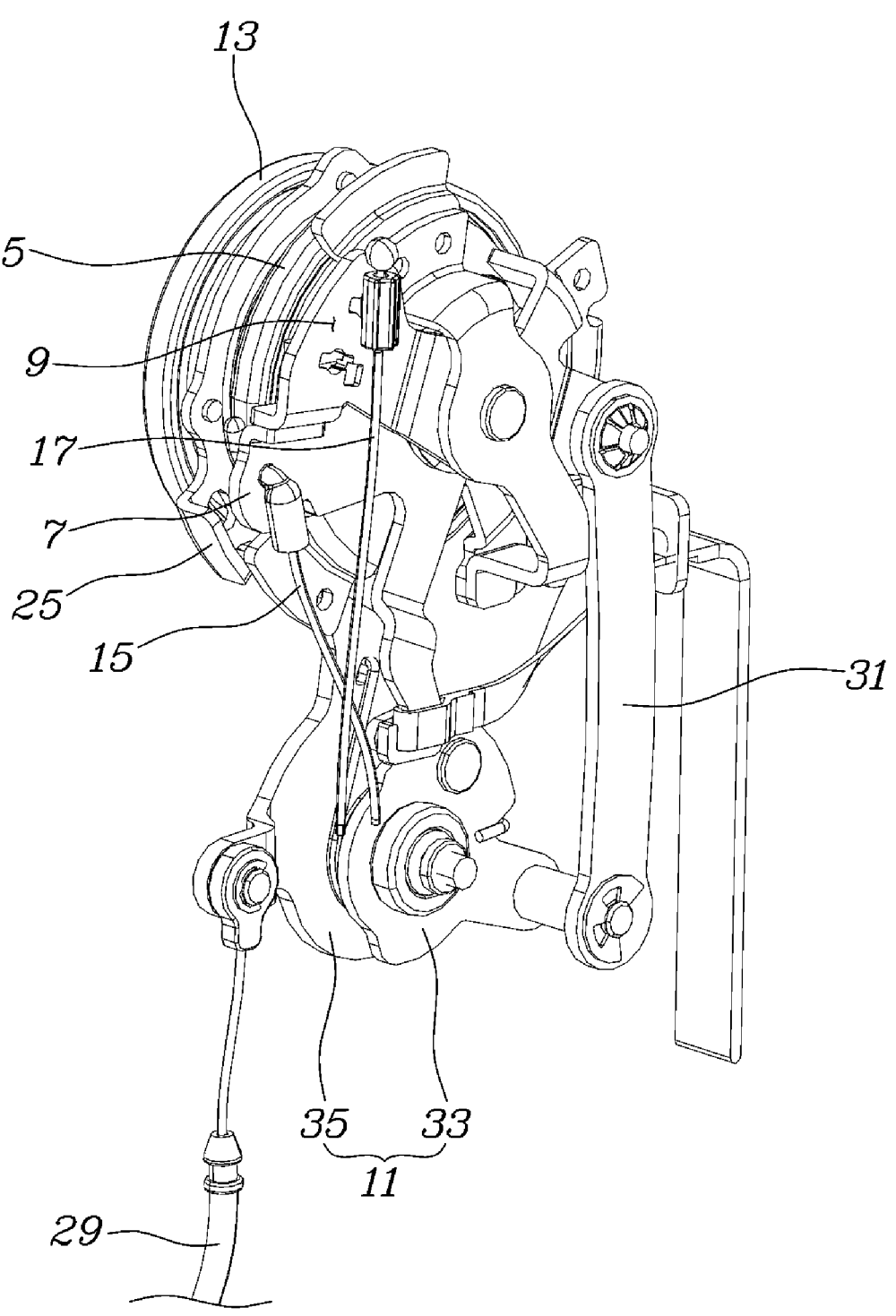
Figure 6:
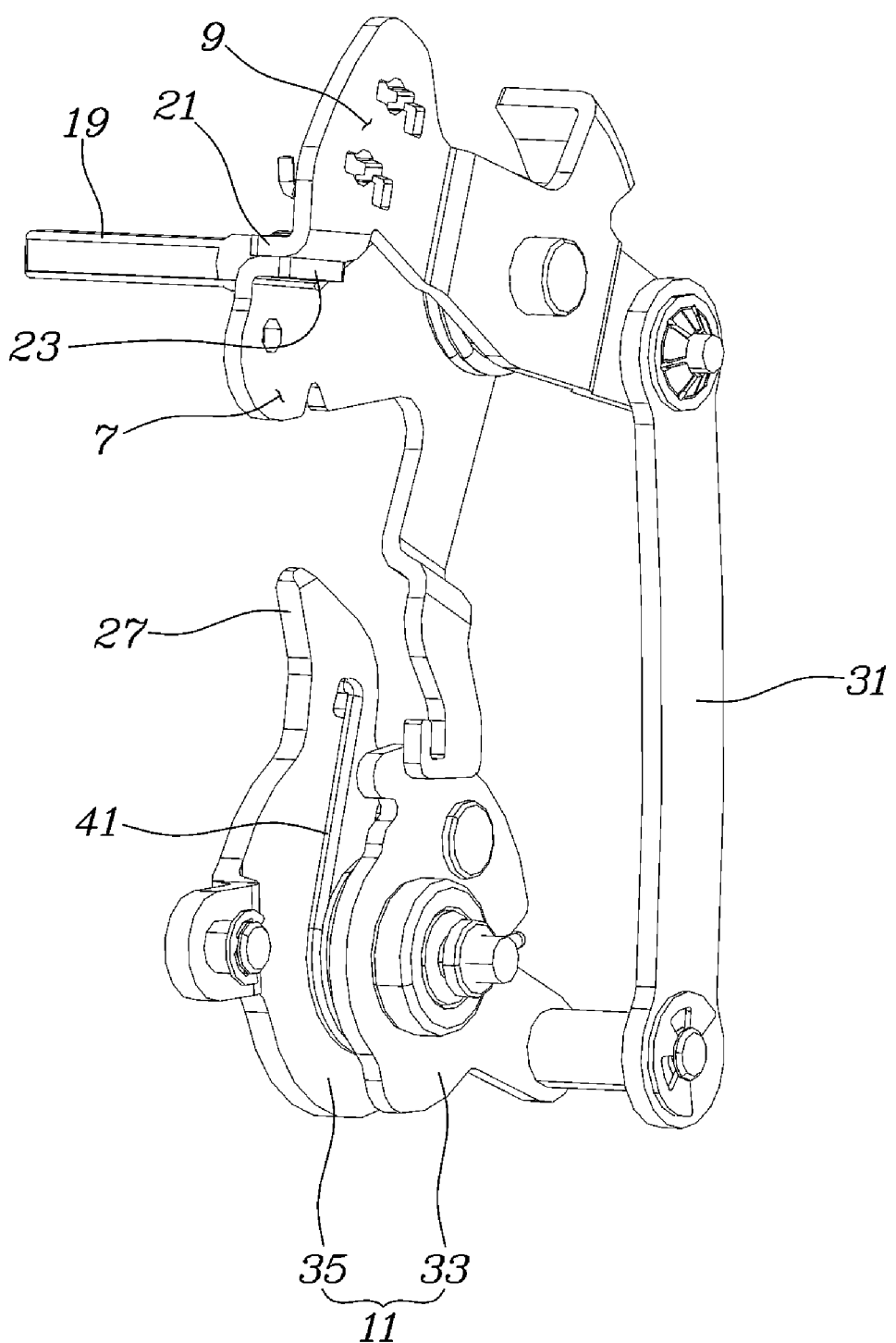
FIGS. 6 and 7 are views illustrating primary constituent elements, among the constituent elements of the vehicular seat according to the present invention in FIGS. 3 to 5, when viewed from different angles, respectively.
Figure 7:
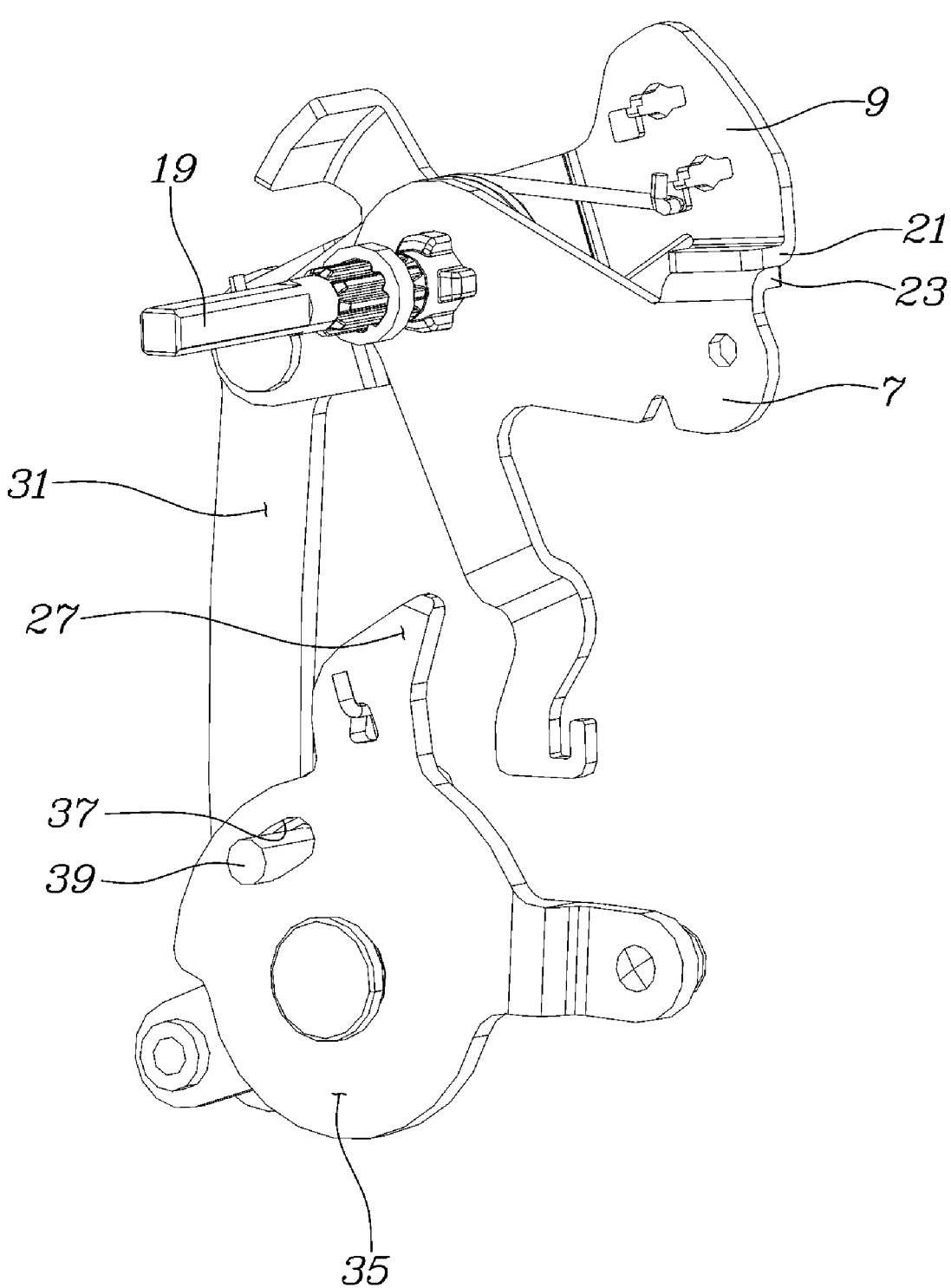
Figure 8:
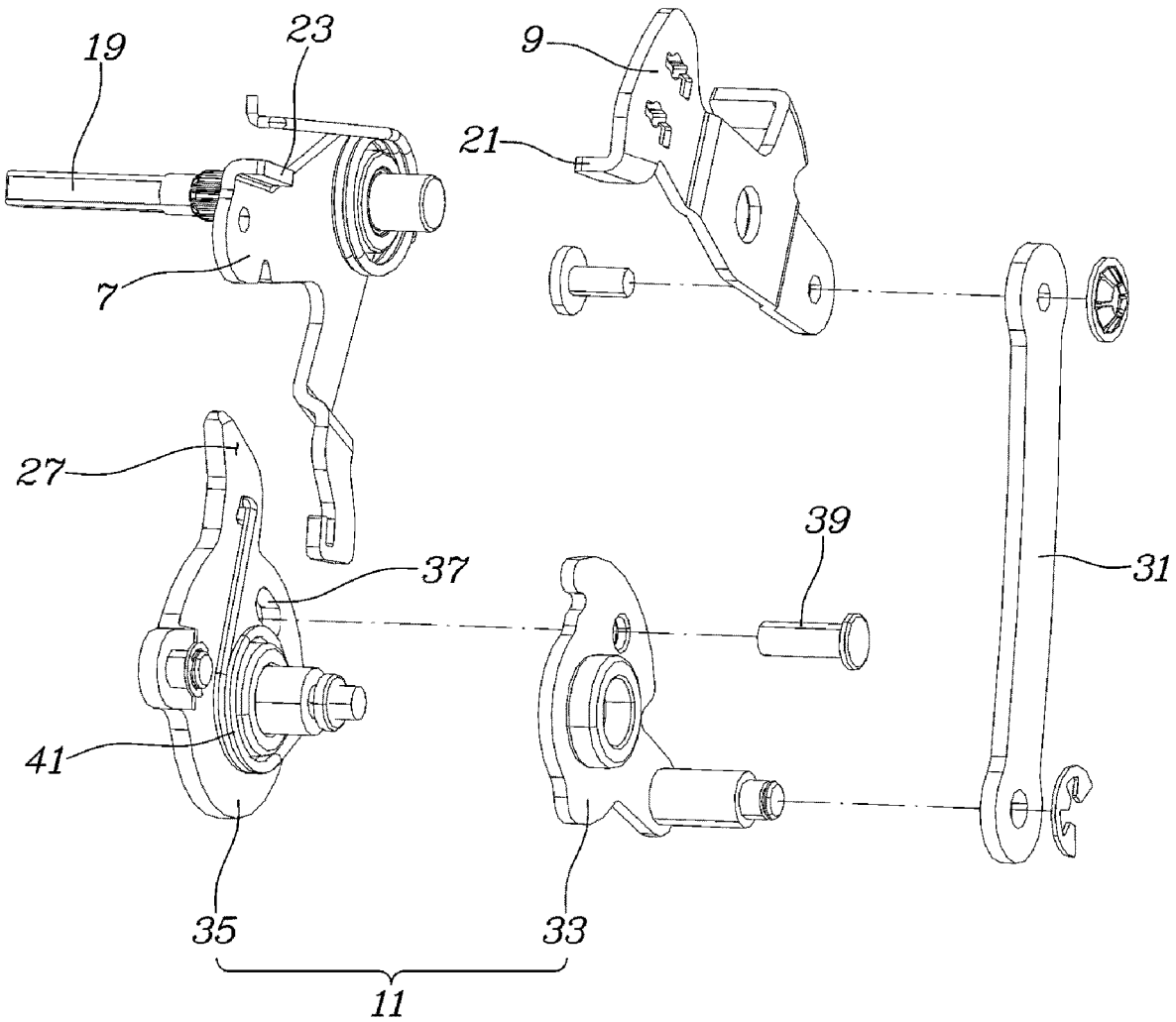
FIG. 8 is an exploded perspective view illustrating the primary constituent elements in FIG. 6.
Figure 9:
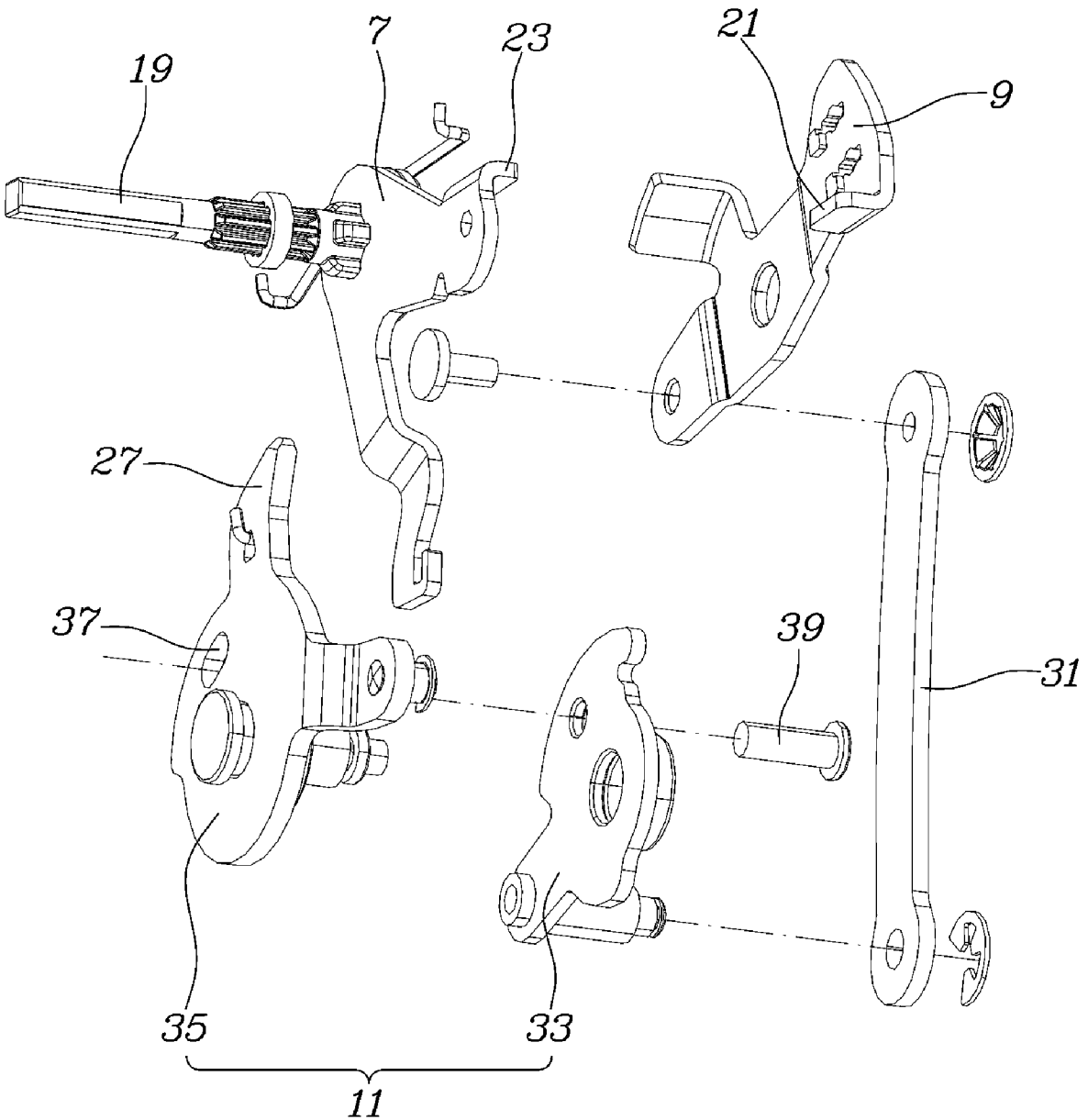
FIG. 9 is an exploded perspective view illustrating the primary constituent elements in FIG. 7.

With reference to FIGS. 1 and 2, a cushion frame 1 making up the seat cushion and a back frame 3 making up the seat back are installed in such a manner that the inclination angle of the seat back can be adjusted by the recliner 5.

According to the present invention, when the vehicular seat is folded, the seat back is inclined sufficiently inward. Furthermore, when a walk-in function of the vehicular seat is performed, the seat back is restricted in such a manner as to be inclined inward only to a predetermined angle, and, simultaneously, a seat rail in a locked state is unlocked in a manner that allows the vehicular seat to slide. Moreover, constituent elements, each with a compact size, may all be installed on one side of the vehicular seat in order to perform the folding and walk-in functions in a distinguished manner.

Specifically, according to the present invention, the back frame 3 is coupled to a portion of the cushion frame 1 in such a manner that the recliner 5 enables the back frame 3 to be inclined with respect to the cushion frame 1. With reference to FIGS. 1 to 9, A vehicular seat according to an embodiment of the present invention is configured to include a recliner 5, a first walk-in lever 7, a folding lever 9, a second walk-in lever 11, and an in-unison operating mechanism. The recliner 5 is installed in such a manner as to adjust an inclination angle of a back frame 3 with respect to a cushion frame 1. The first walk-in lever 7 is installed in such a manner as to release the recliner 5 by being rotated with an operational force for walk-in from an initial position to an operating position. The folding lever 9 is installed in such a manner as to rotate the first walk-in lever 7 when rotated with an operational force for folding and thus to release the recliner 5. The second walk-in lever 11 is installed on the cushion frame 1 in such a manner as to be rotated by the back frame 3 inclined inward by the releasing of the recliner 5 and thus to unlock a seat rail in a locked state and restrict inward inclining of the back frame 3. The in-unison operating mechanism is provided in such a manner as to rotate the second walk-in lever in unison with the folding lever 9, so that the second walk-in lever 11 does not restrict the inward inclining of the back frame 3 when the folding lever 9 is rotated to release the recliner 5.

That is, when the operational force for walk-in is applied to the first walk-in lever 7, the first walk-in lever 7 is rotated, thereby releasing the recliner 5. The back frame 3 in turn is slightly inclined forward with an elastic force exerted by a recliner spring 13. Then, a folding restriction protrusion 25 on the back frame 3 is blocked by a walk-in protrusion 27 on the second walk-in lever 11. Thus, the back frame 3 is restricted in reclining.

At this point, the second walk-in lever 11 is rotated by the back frame 3 to unlock the seat rail in the locked state, allowing the vehicular seat to move. As a result, a space for an occupant to get in and out of a vehicle can be secured. That is, the rotating of the first walk-in lever 7 causes the back frame 3 to be inclined at a predetermined angle as the vehicular seat slides.

When the folding function of the vehicular seat is performed instead of the walk-in function thereof, the operational force for folding is applied to the folding lever 9. Thus, the folding lever 9 rotates the first walk-in lever 7, thereby releasing the recliner 5. At the same time, the folding lever 9 rotates the second walk-in lever 11 through the in-unison operating mechanism. Thus, when the back frame 3 is inclined inward, the second walk-in lever does not restrict the inward inclining of the back frame 3, so that the back frame 3 can be inclined more inward than when in a walk-in state. That is, when the vehicular seat is folded, the second walk-in lever 11 is rotated at a considerable angle, so that the folding restriction protrusion 25 on the back frame 3 is not blocked by the walk-in protrusion 27 on the second walk-in lever 11. Thus, unlike when the walk-in function is performed, the vehicular seat can be sufficiently reclined.

The 'walk-in state' here refers to a state where the back frame 3 stops being inclined by the second walk-in lever 11 after being inclined forward to a predetermined angle.

When a user operates a lever, an actuator, or the like, a straight-line displacement occurs. The operational force for walk-in may be set to transfer this straight-line displacement to the first walk-in lever 7 through a walk-in operating cable 15. The operational force for folding may also be set to transfer this straight-line displacement to the folding lever 9 through a folding operating cable 17.

According to the present embodiment, the first walk-in lever 7 is coupled to an input shaft 19 of the recliner 5 in such a manner that the rotating of the first walk-in lever 7 is restricted. In contrast, the folding lever 9 is rotatably installed on the input shaft 19, so that the folding lever 9 is concentric with the first walk-in lever 7. Furthermore, a driving-for-releasing protrusion 21 is provided on the folding lever 9 in a manner that protrudes from the folding lever 9 toward the first walk-in lever 7, so that the driving-for-releasing protrusion 21 is enabled to be rotated with the operational force for folding, thereby rotating the first walk-in lever 7.

That is, the first walk-in lever 7 is coupled to the input shaft 19 of the recliner 5 in a manner that transfers a rotational force using a spline or the like. The first walk-in lever 7 is configured to release the recliner 5 when rotated from the initial position to the operating position.

The initial position is a position at which the recliner 5 is in a locked state because the operational force for walk-in is not applied to the first walk-in lever 7. At the initial position, an angle of the back frame 3 is fixed with respect to the cushion frame 1. In contrast, the operating position is a position at which the recliner 5 is released when the input shaft 19 is rotated by the recliner 5 because the operational force for walk-in is applied. At the operating position, an angle of the back frame 3 with respect to the cushion frame 1 can be adjusted.

In addition, the folding lever 9 is rotatably inserted into the input shaft 19 and is concentric with the first walk-in lever 7. The driving-for-releasing protrusion 21 is provided on the folding lever 9. Thus, when the folding lever 9 is rotated with the operational force for folding, the driving-for-releasing protrusion 21 rotates the first walk-in lever 7 from the initial position to the operating position. In this manner, the recliner 5 is released.

The driving-for-releasing protrusion 21 may be configured to protrude from the folding lever 9 in such a manner as to directly press against a lateral surface of the first walk-in lever 7. However, in order to secure operational stability and durability, a driven-for-releasing protrusion 23 may be provided on the first walk-in lever 7 in a manner that protrudes from the first walk-in lever 7 toward the folding lever 9 to stably receive the rotational displacement transferred by the driving-for-releasing protrusion 21.

According to the present embodiment, the driven-for-releasing protrusion 23 is integrally formed with the first walk-in lever 7 in a manner that comes into a surface contact with the driving-for-releasing protrusion 21.

The walk-in protrusion 27 is provided on the second walk-in lever 11 in a manner that protrudes from the second walk-in lever 11 toward a radial direction from the rotational center of the second walk-in lever 11, so that the walk-in protrusion 27 is hooked onto the folding restriction protrusion 25 on the back frame 3 that is inclined inward by releasing the recliner 5. A walk-in cable 29 for unlocking the seat rail in the locked state when pulled is connected to the second walk-in lever 11.

The second walk-in lever 11 is installed under the first walk-in lever 7, and the walk-in protrusion 27 is configured to protrude upward from the rotational center of the second walk-in lever 11.

Therefore, when the back frame 3 is inclined inward, the folding restriction protrusion 25, integrally installed on the back frame 3, moves along an arc trajectory that is centered around the input shaft 19 of the recliner 5 and the walk-in protrusion 27 on the second walk-in lever 11 protrudes to get in the way of the arc trajectory along which the folding restriction protrusion 25 moves. Thus, when the back frame 3 is inclined inward by performing the walk-in function, the folding restriction protrusion 25 is hooked onto the walk-in protrusion 27, thereby interrupting the inward inclining of the back frame 3.

In addition, when the inward inclining of the back frame 3 is interrupted as described above, the second walk-in lever 11 is rotated with a force exerted on the walk-in protrusion 27. When this is done, the walk-in cable 29 is pulled, thereby unlocking the seat rail in the state of being locked. Thus, the vehicular seat moves by a separately provided walk-in spring or the like, in order for the occupant to get in and out of the vehicle.

According to the present embodiment, the in-unison operating mechanism is configured as a link member 31. Both end portions of the link member 31 are connected in a rotatable state to the folding lever 9 and the second walk-in lever 11, respectively.

The link member 31 is configured in such a manner that one end portion thereof is connected to a side of the folding lever 9, which is opposite to a side, on which the driving-for-releasing protrusion 21 is provided, of the folding lever 9, with the rotational center of the folding lever 9 being positioned between the both sides of the folding lever 9. Moreover, the link member 31 is configured in such a manner that the other end portion thereof is connected to a side of the second walk-in lever 11, which is opposite to a side, to which the walk-in cable 29 is connected, of the second walk-in lever 11, with the rotational center of the second walk-in lever 11 being positioned between the both sides of the second walk-in lever 11.

The folding lever 9, when rotated with the operating force for folding, is rotated together with the first walk-in lever 7, thereby releasing the recliner 5. Thus, the back frame 3 starts to be inclined inward. When the folding lever 9 is rotated, the link member 31 rotates the second walk-in lever 11 at the same time, so that walk-in protrusion 27 on the second walk-in lever 11 gets out of the way of the arc trajectory along which the folding restriction protrusion 25 moves. In this manner, the back frame 3 is inclined more inward than when in the walk-in state.

At this time, the walk-in cable 29 is not pulled.

That is, the folding function is performed in which only the back frame 3 is inclined inward to in front of the vehicular seat.

The second walk-in lever 11 may be configured to include an in-unison operating lever 33 and an operating lever 35. The in-unison operating lever 33 is connected to the folding lever 9 through the in-unison operating mechanism. The operating lever 35 is installed in a manner that is concentric with the in-unison operating lever 33 and is relatively rotatable within a predetermined range and performs a function of unlocking the seat rail in the locked state and restricting the inward inclining of the back frame 3.

That is, the second walk-in lever 11 may be configured as a single body. However, according to the present embodiment, as described above, the second walk-in lever 11 is configured to include the in-unison operating lever 33 and the operating lever 35 that are separated from each other.

A range where the in-unison operating lever 33 and the operating lever 35 are relatively rotatable to each other may be set to be restricted by an arc adjustment groove 37 formed in each of the in-unison operating lever 33 and the operating lever 35 and an adjustment pin 39 that is inserted into the arc adjustment groove 37.

According to the present embodiment, the adjustment groove 37 is formed in the operating lever 35, and the adjustment pin 39 is provided on the in-unison operating lever 33. However, the adjustment groove 37 may be formed in the in-unison operating lever 33, and the adjustment pin 39 may be provided on the operating lever 35.

A support spring 41 is installed between the in-unison operating lever 33 and the operating lever 35. The support spring 41 elastically supports the in-unison operating lever 33 and the operating lever 35 in such a manner that relative positions thereof are kept constant.

The in-unison operating lever 33 and the operating lever 35 are separately provided to make up the second walk-in lever 11. They are assembled using the adjustment groove 37, the adjustment pin 39, and the support spring 41. The reason for the providing and assembling is to easily adjust a gap between a position at which the folding lever 9 is connected and a position at which the walk-in protrusion 27 is connected, using the link member 31.

With the link member 31, the second walk-in lever 11 operates in unison with the folding lever 9. Accordingly, in a case where a position at which the link member 31 is connected to the second walk-in lever 11 and a position of the walk-in protrusion 27 are not properly aligned, when the back frame 3 is inclined inward by the operating of the folding lever 9, the walk-in protrusion 27 may not sufficiently move out of the way of the arc trajectory along which the folding restriction protrusion 25 moves. This phenomenon that may occur due to dimensional tolerances of various components, assembled states thereof, and the like can be more easily prevented from occurring.

For example, the existing operating lever 35 may be replaced with an operating lever 35 having an adjustment groove 37 different in size and position. Alternatively, the existing in-unison operating lever 33 may be replaced with an in-unison operating lever 33 having an adjustment pin 39 different in position. Accordingly, on the second walk-in lever 11, a gap between a position at which the link member 31 is connected to the folding lever 9 and a position at which the walk-in protrusion is provided is changed. Thus, when the seat back is inclined inward, the phenomenon described above can be prevented from occurring.

The specific embodiment of the present invention is illustrated and described, but it would be obvious to a person of ordinary skill in the art that various modifications and alterations may possibly be made to the present invention without departing from the technical idea of the present invention that is defined in the following claims.

DESCRIPTION OF THE REFERENCE NUMERALS IN THE DRAWINGS

1: Cushion Frame
3: Back Frame
5: Recliner
7: First Walk-in Lever
9: Folding Lever
11: Second Walk-in Lever
13: Recliner Spring
15: Walk-in Operating Cable
17: Folding Operating Cable
19: Input Shaft
21: Driving-for-releasing Protrusion
23: Driven-for-releasing Protrusion
25: Folding Restriction Protrusion
27: Walk-in Protrusion
29: Walk-in Cable
31: Link Member
33: In-unison Operating Lever
35: Operating Lever
37: Adjustment Groove
39: Adjustment Pin
41: Support Spring

The invention claimed is:

1. A vehicular seat, comprising:
a recliner configured to adjust an inclination angle of a back frame with respect to a cushion frame;
a first walk-in lever configured to release the recliner by being rotated with an operational force for walk-in from an initial position to an operating position;
a folding lever configured to rotate the first walk-in lever when rotated with an operational force for folding and thus to release the recliner;
a second walk-in lever disposed on the cushion frame to be rotated by the back frame inclined inward by releasing of the recliner and thus to unlock a seat rail in a locked state and restrict inward inclining of the back frame; and
an in-unison operating mechanism configured to rotate the second walk-in lever in unison with the folding lever, wherein the second walk-in lever does not restrict the inward inclining of the back frame when the folding lever is rotated to release the recliner.

2. The vehicular seat of claim 1, wherein the first walk-in lever is coupled to an input shaft of the recliner, and rotation of the first walk-in lever is restricted by the input shaft, wherein the folding lever is rotatably installed on the input shaft and is concentric with the first walk-in lever, and
wherein a driving-for-releasing protrusion is disposed on the folding lever and protrudes from the folding lever toward the first walk-in lever, the driving-for-releasing protrusion being configured to be rotated with the operational force for folding and to rotate the first walk-in lever.

3. The vehicular seat of claim 2, wherein a driven-for-releasing protrusion is disposed on the first walk-in lever and protrudes from the first walk-in lever toward the folding lever to stably receive a rotational displacement transferred by the driving-for-releasing protrusion.

4. The vehicular seat of claim 2, wherein a walk-in protrusion is disposed on the second walk-in lever and protrudes from the second walk-in lever toward a radial direction from a rotational center of the second walk-in lever, the walk-in protrusion being configured to be hooked onto a folding restriction protrusion on the back frame that is inclined inward by releasing the recliner, and
wherein a walk-in cable for unlocking the seat rail in the locked state when pulled is connected to the second walk-in lever.

5. The vehicular seat of claim 4, wherein the second walk-in lever is disposed under the first walk-in lever, and
wherein the walk-in protrusion protrudes upward from the rotational center of the second walk-in lever.

6. The vehicular seat of claim 4, wherein the in-unison operating mechanism is configured as a link member, both end portions of the link member being connected in a rotatable state to the folding lever and the second walk-in lever, respectively.

7. The vehicular seat of claim 6, wherein one end portion of the link member is connected to a side of the folding lever, which is opposite to another side of the folding lever, on which the driving-for-releasing protrusion is disposed, with a rotational center of the folding lever being positioned between both sides of the folding lever, and
wherein another end portion of the link member is connected to a side of the second walk-in lever, which is opposite to another side of the second walk-in lever, to which the walk-in cable is connected, with the rotational center of the second walk-in lever being positioned between both sides of the second walk-in lever.

8. The vehicular seat of claim 1, wherein the second walk-in lever comprises:
an in-unison operating lever connected to the folding lever through the in-unison operating mechanism; and
an operating lever disposed concentrically with the in-unison operating lever and is relatively rotatable within a predetermined range, the operating lever being configured to unlock the seat rail in the locked state and restrict the inward inclining of the back frame.

9. The vehicular seat of claim 8, wherein a range where the in-unison operating lever and the operating lever are relatively rotatable with respect to each other is set to be restricted by an arc adjustment groove formed in each of the in-unison operating lever and the operating lever and an adjustment pin that is inserted into the arc adjustment groove.

10. The vehicular seat of claim 9, wherein a support spring that elastically supports the in-unison operating lever and the operating lever to keep relative positions thereof constant is disposed between the in-unison operating lever and the operating lever.

11. The vehicular seat of claim 8, wherein a walk-in protrusion is disposed on the operating lever and protrudes from the second walk-in lever toward a radial direction from a rotational center of the second walk-in lever, the walk-in protrusion being configured to be hooked onto a folding restriction protrusion on the back frame that is inclined inward by releasing the recliner, and
wherein a walk-in cable for unlocking the seat rail in the locked state is connected at a position that is spaced away from the walk-in protrusion.

12. The vehicular seat of claim 11, wherein the in-unison operating lever is connected to the folding lever by the in-unison operating mechanism, on an opposite side from where the walk-in cable is connected to the operating lever, with a rotational center of the operating lever as a reference point.

13. The vehicular seat of claim 12, wherein the in-unison operating mechanism is configured as a link member that connects the folding lever and the in-unison operating lever, when the folding lever is rotated in a direction in which the recliner is released, the walk-in protrusion on the second walk-in lever is out of a rotational radius of the folding restriction protrusion on the back frame, and the second walk-in lever is rotated in a direction opposite to a direction in which the walk-in cable is pulled.

* * * * *